(12) United States Patent
Morris

(10) Patent No.: US 6,543,486 B1
(45) Date of Patent: Apr. 8, 2003

(54) LEAKAGE PLUGGING METHOD AND IMPLEMENT

(75) Inventor: Joseph H. Morris, Queenstown, MD (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 09/934,714

(22) Filed: Aug. 23, 2001

(51) Int. Cl.[7] ................................................. F16L 55/12
(52) U.S. Cl. .............................. 138/93; 138/94; 138/98; 138/99; 114/227; 114/228; 206/522
(58) Field of Search .............................. 138/89, 93, 94, 138/97, 98, 99; 114/227, 228; 206/522

(56) References Cited

U.S. PATENT DOCUMENTS

| 1,702,031 A | * | 2/1929 | Wesseler | 138/89 |
| 2,324,520 A | * | 7/1943 | Lamson | 138/89 |
| 3,841,256 A | * | 10/1974 | Etchelecou et al. | 114/227 |
| 4,385,582 A | * | 5/1983 | Fuerst | 114/227 |
| 5,143,012 A | * | 9/1992 | Elkowitz | 114/227 |
| 5,245,941 A | * | 9/1993 | Gattuso | 114/227 |
| 5,253,602 A | * | 10/1993 | Moriarty | 114/227 |
| 5,954,095 A | * | 9/1999 | Grigory et al. | 138/98 |

* cited by examiner

Primary Examiner—James Hook
(74) Attorney, Agent, or Firm—Jacob Shuster

(57) ABSTRACT

An inflatable plug within a fragile streamlined cover attached to a rigid lance tube is pushed through a leakage hole to plug it on an upstream end by being inflated with pressurized fluid conducted through the lance tube to rupture the fragile cover and position the plug against the wall sealingly covering the upstream end of the hole.

9 Claims, 2 Drawing Sheets

LEAKAGE PLUGGING METHOD AND IMPLEMENT

The present invention relates to the plugging of leakage holes in tanks, bulkheads, boat hulls and the like.

BACKGROUND OF THE INVENTION

Damage control techniques presently available for plugging leakage openings in the walls of enclosures such as tanks, bins and pipes involve use of hammered plugs, pads or sheets of plywood or the like to close off such openings. Such plugging materials are applied from the leakage downstream side so as to overcome hydrostatic or hydrodynamic pressure of a fluent type leaking substance such as fluids or liquids and granular material. It is an important object of the present invention to provide more easily applied leak plugage in a wide variety of installations.

SUMMARY OF THE INVENTION

In accordance with the present invention, leakage plugging of an opening or hole is performed by personnel utilizing a low force push applied through a rigid elongated lance to a deflated flexible plug enclosed within a streamlined cover section to facilitate guided displacement thereof through the hole from its leakage downstream end. After the deflated plug is so projected through the hole, pressurized fluid is conducted through the lance into the deflated plug causing inflation thereof and rupture of its streamlined cover section made of fragile material. The lance is then withdrawn from the downstream end of the hole to pull a portion of the inflated plug into the hole and otherwise position the plug over the hole on its upstream end. A single person may perform the foregoing hole plugging procedure by valve controlled use of fluid pressure conducted through the lance to inflate the plug which is then readily maneuvered into position by means of the lance from a location spaced from the hole on its downstream end.

BRIEF DESCRIPTION OF DRAWING

A more complete appreciation of the invention and many of its attendant advantages will be readily appreciated as the same becomes better understood by reference to the following detailed description when considered in connection with the accompanying drawing wherein.

DETAILED DESCRIPTION OF PREFERRED EMBODIMENT

Figure 1:
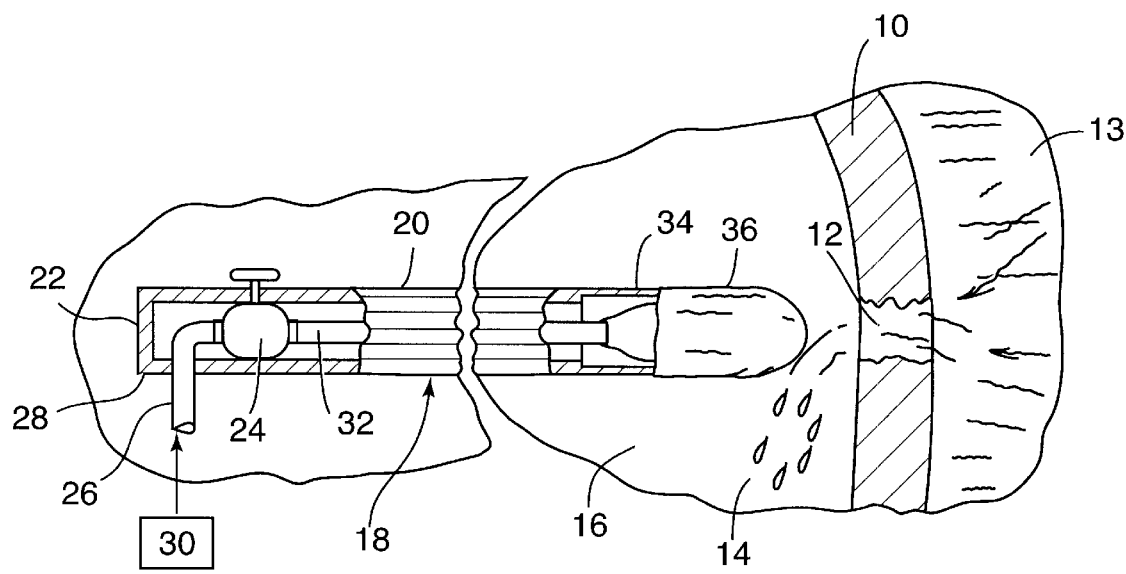
FIG. 1 is a partial section view of a leakage plugging implement positioned within the hull of a boat adjacent to a leakage hole therein.

Referring now to the drawing in detail, FIG. 1 illustrates a portion of a boat hull 10 submerged in a body of seawater 12, such hull 10 having a damage opening or hole 12 formed therein through which leakage flow 14 occurs downstream into the hull enclosure 16 under pressure of the seawater 13 as the external substance to which the hull 10 is exposed on the upstream end of the hole 12. Pursuant to the present invention, when such hole 12 is discovered it is plugged by personnel utilizing an implement generally referred to by reference numeral 18. The hole plugging procedure is hereinafter described by reference to FIGS. 1–4 illustrating various sequential stages of such procedure capable of being performed by a single person utilizing the hole plugging implement 18.

With continued reference to FIG. 1, the implement 18 is shown initially positioned within the enclosure 16 in alignment with the hole 12 in spaced adjacency to its downstream end. Such implement 18 includes a lance 20 in the form of an axially elongated, rigid tube or pipe closed at one end 22. An inflation control valve 24 is positioned within the lance tube 20 adjacent the end 22 and is connected by a hose 26 extending externally therefrom through a port 28 to some pressurized source 30 of a fluent inflation material as diagrammed in FIG. 1. Pressurized inflation fluid is accordingly admitted under selective control through the valve 24 into a fluid material. Such plug 34 is shown in a deflated condition within a fragile streamlined cover section 36 of the implement 18, projecting from an open end of the rigid lance tube 20 to which it is attached. Such fragile cover section 36 of the implement 18 is pushed into the hole 12 from its downstream end under a relatively low axial force applied thereto by personnel through the rigid tube of the lance 20.

Figure 2:
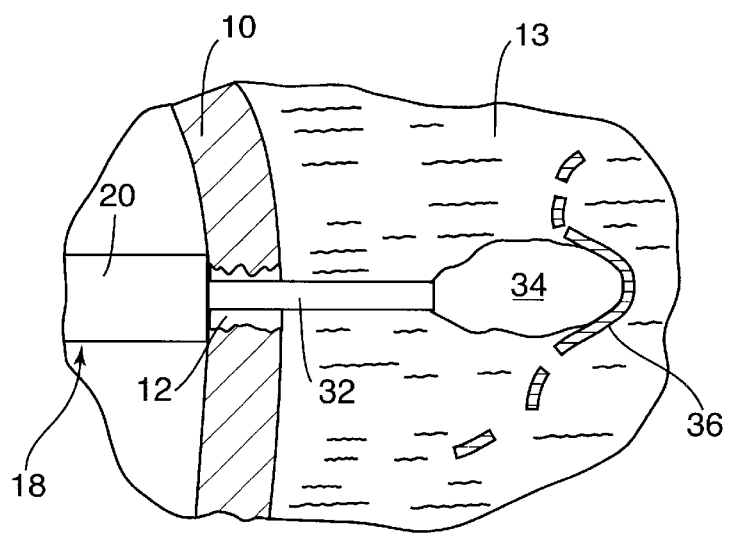
FIGS. 2, 3 and 4 are partial section views showing subsequent sequential stages of the hole plugging procedure associated with the implement shown in FIG. 1.
Figure 3:
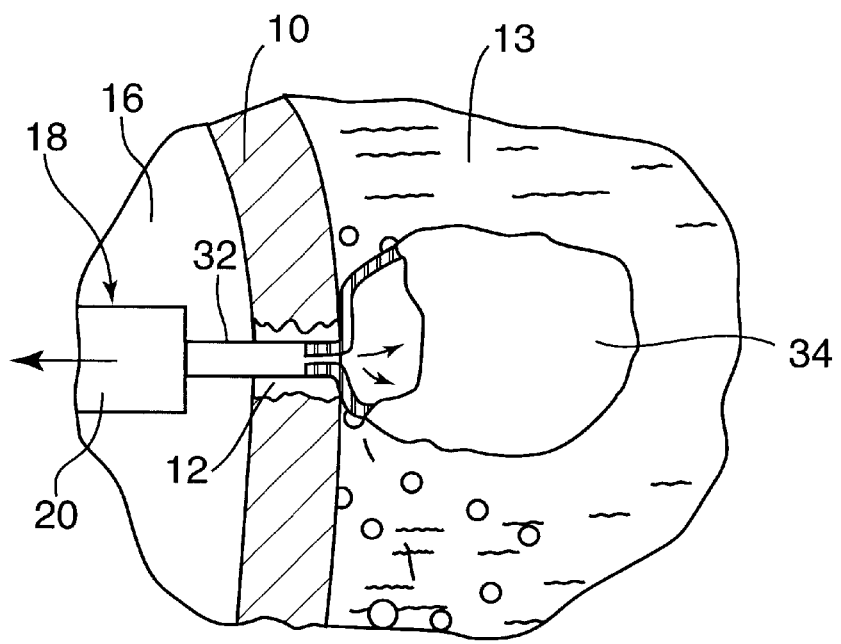
Figure 4:
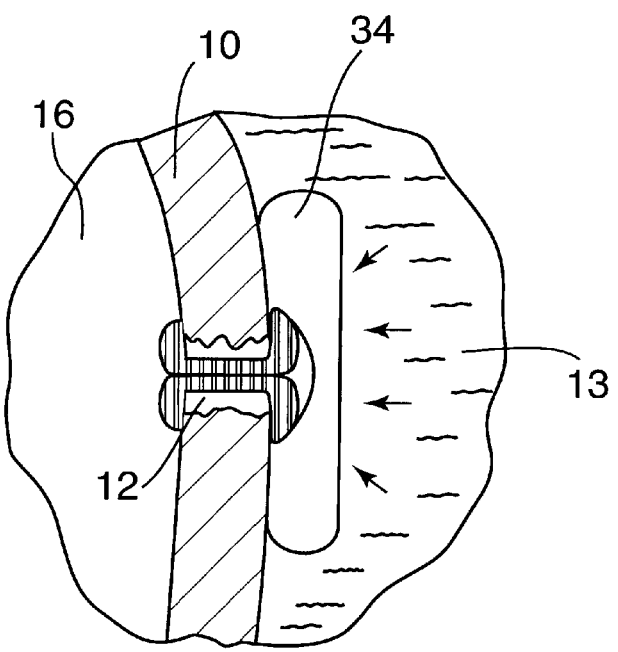

Once the fragile cover section 36 is fully inserted through the hole 12 into the seawater 13, the inflation valve 24 is opened to admit pressurized fluid through the inflation fluid conducting tube 32 into the plug 34 to begin inflation thereof as shown in FIG. 2. Inflation of the plug 34 causes rupture of the fragile cover section 36 into small pieces which fall away from the inflated plug 34. Once the plug 34 is fully inflated as shown in FIG. 3, the valve 24 is closed to maintain the plug 34 in its fully inflated condition while the lance 20 is withdrawn from abutment with the inner surface of the hull 10 to thereby maneuver the inflated plug 34 into a position in contact with the external wall surface of the hull 10 covering the hole 12 on its upstream end. The lance 20 is then fully withdrawn to remove the inflation tube 32 from the plug 34 pulled into the hole and held in place covering the hole 12 by hydrostatic forces of the seawater 12, as shown in FIG. 4.

It will be apparent from the foregoing description that the present invention is applicable to plugging leakage of liquids or granular substances such as powder and grains through holes including cracks and splits, for example, formed in enclosure walls such as the boat hull 10, as well as other enclosing walls of structures such as tanks, pipes, bins, bulkheads and the like. Also the lance 20 may be shaped and dimensioned to fit different needs or requirements by selection of graduated sizes and lengths and configured to allow use of screw-on extensions. Such different requirements would be dependent on the installational factors such as the nature of the external substance, which includes liquids and granular materials such as powder and grains. The inflatable plug 34 may therefore be shaped to accommodate specifically different needs including pancake, conical, spherical, trapezoidal and spear shapes for example. The inflation fluid may include materials such as foam or epoxy for semi-permanent repair. Such repair materials may alternatively be injected after inflation of the plug 34. The flexible material for the plug 34 is selected for tear resistance and chemical compatibility with the leakage substance. Further, several of the implements 18 may be bundled together for plugging of large openings.

Obviously, other modifications and variations of the present invention may be possible in light of the foregoing teachings. It is therefore to be understood that within the scope of the appended claims the invention may be practiced otherwise than as specifically described.

What is claimed is:

1. In combination with an enclosure having a wall exposed to an external substance, an implement for plugging an opening formed in said wall through which leakage of the external substance occurs from an upstream end of the opening to a downstream end thereof within the enclosure, comprising: an elongated lance adapted to be positioned within the enclosure in alignment with the opening; a flexible plug; fragile cover means attached to the lance and enclosing the plug therein for guided insertion thereof through the opening in response to force applied to the lance inside of the enclosure; and pressurized inflation means extending through the lance into the plug for inflation thereof after said insertion thereof through the opening to rupture the fragile cover means and sealingly close the opening on the upstream end thereof under pressure of the external substance.

2. The implement as defined in claim 1, wherein the lance is a rigid tube closed at one end opposite an open end and-to which the flexible plug is attached; the fragile cover means enclosing the flexible plug having a streamlined shape to facilitate said guided insertion thereof into the external substance.

3. The combination as defined in claim 2, wherein the pressurized inflation means comprises conducting means connecting the plug to a source of pressurized fluid for delivering the inflation fluid to the plug; and valve means within the lance and connected to the conducting means for controlled inflation of the plug after said insertion thereof through the opening into the external substance.

4. The combination as defined in claim 3, wherein the enclosure is a boat; the wall is a hull; and said external substance is seawater.

5. The combination as defined in claim 1, wherein the pressurized inflation means comprises: conducting means connected to the plug and extending through the lance to a source of pressurized fluid for delivering the inflation fluid to the plug; and valve means within the lance and connected to the conducting means for controlled inflation of the plug after said insertion thereof through the opening into the external substance.

6. The combination as defined in claim 1, wherein the enclosure is a boat; the wall is a hull; and said external substance is seawater.

7. In combination with an enclosure having a wall exposed to an external substance, a method for plugging a hole formed in the wall to prevent leakage of the external substance therethrough from an upstream end of the opening into the enclosure to a downstream end of the opening, comprising the steps of: positioning an inflatable plug within the enclosure in spaced adjacency to the downstream end of the opening; enclosing the positioned plug within a fragile streamlined cover for guiding insertion thereof through the opening; applying a force to the cover and the plug from a location inside of the enclosure spaced from the downstream end of the opening for effecting said guided insertion of the plug through the opening into the external substance; and controllably inflating the plug after entry thereof into the external substance from a pressurized source within the enclosure to rupture the fragile streamlined cover and sealingly close the opening on the upstream end thereof under pressure of the external substance.

8. The combination as defined in claim 7, wherein the enclosure includes tanks, pipes and bins, and the external substance includes liquids, powders and grains.

9. The combination as defined in claim 7, wherein the enclosure is a boat; the wall is a hull; and said external substance is seawater.

* * * * *